Patented Oct. 5, 1943

2,331,263

UNITED STATES PATENT OFFICE 2,331,263

METHOD OF MAKING CO-POLYMERS OF STYRENE

Edgar C. Britton, Gerald H. Coleman, and John W. Zemba, Midland, Mich., assignors to The Dow Chemical Company, Midland, Mich., a corporation of Michigan No Drawing. Application November 2, 1939, Serial No. 302,576

7 Claims. (Cl. 260—78)

This invention concerns an improved method of making insoluble and non-swelling polymers derived from styrene.

In the co-pending applications of Britton, Marshall and Le Fevre, Serial No. 217,224, filed July 2, 1938, and Serial No. 324,230, filed March 15, 1940, are described certain new polymeric products prepared by polymerizing monomeric styrene in the presence of certain unsaturated esters. These products are characterized by being substantialy insoluble and non-swelling in common organic solvents, such as benzene, toluene, ethanol, acetone, ethyl-benzene, carbon tetrachloride, petroleum ether, xylene, ethyl acetate, etc. They are further characterized by their friability and opaque white appearance, in contrast to the tough, transparent, glass-like styrene co-polymers previously known. The new products, however, are usually capable of being molded to form clear, transparent molded articles which are substantially insoluble and non-swelling in organic solvents and which are somewhat more resistant to distortion by heat than is molded polystyrene. These products are herein referred to as "co-polymers of styrene," although, as stated in the above-mentioned application, their exact molecular structure is not definitely known.

According to said co-pending application, the new insoluble and non-swelling co-polymers are prepared by polymerizing at a temperature below about 110° C. a mixture of monomeric styrene and an unsaturated ester co-polymerizing agent containing at least two

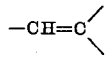

groups in the molecule. Examples of such esters are diallyl maleate, allyl cinnamate, diallyl oxalate, di-(2-chloroallyl) adipate, trimethallyl phosphate, diallyl fumarate, ethylene dicinnamate, 2-chloroallyl furoate, the dicinnamate of 1.4-dioxanediol-2.3, 2-methylallyl cinnamate, 2-ethylallyl vinylacetate, 2-chloroallyl crotonate, etc. The product initially obtained by operating in this manner is an opaque, white, pulverulent mass, having associated therewith more or less of a tough, glass-like resin which is capable of being swelled in benzene and similar aromatic hydrocarbon solvents. Ths proportions in which the two types of polymers are formed depends upon a number of factors, including the particular co-polymerizing agent employed, the conditions under which the co-polymerization is carried out, the purity of the styrene, etc., but seldom is the insoluble and non-swelling type of copolymer obtained as the sole product. While the mixed polymerizate may be employed in the manufacture of molded articles, etc., it is usually desirable to separate the two types of materials. Such separation has heretofore been carried out by treating the mixed product with a swelling solvent, whereby the glass-like co-polymer is caused to swell to a gel which may be decanted or strained from the non-swelling material. The latter is then washed with the solvent, dried, and obtained as a friable, white solid, resembling bleached wood pulp in appearance. This method of separation, however, is not entirely satisfactory since the swelling type of co-polymer usually swells but slightly, thereby requiring the use of large amounts of solvent and the expenditure of considerable time and effort to effect even a partial separation of the two products. Accordingly, it is seldom that the insoluble and non-swelling product is obtained substantialy free from the glass-like, swelling co-polymer.

We have now found that the separation of the two types of co-polymer may be greatly improved by carrying out the co-polymerization reaction in the presence of an inert diluent which is capable of swelling the swelling type of co-polymer. By operating in this manner, the latter product is apparently obtained as a mass of partially swollen discrete particles rather than as a hard glass-like mass, and is very easily further swelled to a thin gel by the usual swelling solvents, such as benzene, toluene, etc. In some cases, it may even be dissolved to form viscous solutions in such solvents. Accordingly, substantially complete separation of the two types of products is greatly facilitated. The insoluble and non-swelling type of co-polymer is not affected by the inert diluent, and frequently is obtained in increased yield, probably because of a retarding effect of the diluent on the formation of the swelling type of co-polymer. Moreover, when carrying out the co-polymerization reaction in the presence of an inert diluent according to the invention, it is possible to employ somewhat higher polymerization temperatures without lowering the yield of the desired insoluble and non-swelling type of product.

The diluent materials which are employed in our improved process are inert in the sense that they do not react with the monomeric styrene or the co-polymerizing agent under the conditions of polymerization, nor do they substantially retard or inhibit the formation of the desired insoluble and non-swelling co-polymer. They are also capable of swelling the ordinary swelling type of styrene co-polymer, such as the co-polymer of styrene and divinyl benzene disclosed in U. S. Patent 2,089,444, although such swelling action may be very slight. Such suitable diluents may be materials of the type commonly classed as solvents, e. g. benzene, toluene, cyclohexane, xylene, acetone, ethylene dichloride, ethylbenzene, carbon tetrachloride, methyl ethyl ketone, tetrachloroethylene, amyl chloride, butyl acetate, butyl alcohol, propylene dichloride, dibutyl ether, tetralin, amyl alcohol, cyclohexanol, "Cellosolve," etc., or plasticizing agents, such as methyl abietate, dibutyl phthalate, dibenzyl succinate, butyl acetyl ricinoleate, butyl phthalyl butyl glycolate, tricresyl phosphate, castor oil, dibenzyl tartrate, 2-(4-tertiarybutylphenoxy)-ethyl crotonate, cyclohexyl diphenyloxide, 1.3-diphenoxy-isobutane, tertiary - amyl - diphenyloxide, pentachlor - diphenyloxide, phenoxy-propylene oxide, allyl levulinate, 3-n-butoxy-diphenyl, diethyl phthalate, ethyl o, p-toluene sulfonamide, mono-phenyl di-o-xenyl phosphate, chlorinated diphenyl, camphor, petroleum oil, 1,2-di-(4-chlorophenyl)-ethane, 2-(2-methylphenoxy)-ethyl furoate, dibenzyl maleate, allyl naphthenates, etc. Normally liquid or solid hydrocarbons, chlorinated hydrocarbons and esters form a preferred class of diluents because of their general stability and non-reactivity.

In preparing the insoluble and non-swelling type of styrene co-polymer according to the invention, a mixture of monomeric styrene and an unsaturated ester containing at least two

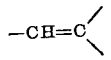

groups is polymerized by heating at a temperature below about 110° C., preferably at 50°–80° C., in the presence of a diluent of the type hereinbefore defined. The unsaturated ester is usually employed in a proportion between about 1.0 and about 25.0 per cent by weight of the monomeric styrene, although other proportions may be employed. The preferred unsaturated ester co-polymerizing agents are the allyl, 2-chloroallyl, and 2-methylallyl esters of low molecular weight mono- or poly-carboxylic acids, such as maleic acid, oxalic acid, fumaric acid, cinnamic acid, etc., although more complex esters of higher molecular weight may be employed if desired.

The diluent is not absorbed by the insoluble and non-swelling type of co-polymer and, accordingly, upon completion of the polymerization, is associated entirely with the small amount of glass-like, swelling co-polymer. Since the proportion of the latter product in the polymerized mass depends largely upon the polymerization temperature and the particular unsaturated ester co-polymerizing agent employed, the optimum amount of diluent depends upon these variants as well as upon the diluent itself. Ordinarily, however, we prefer to employ the diluent in a proportion between about 5 and about 50 per cent by weight of the monomeric styrene. Since the average yield of the glass-like, swelling co-polymer is in the neighborhood of 10–30 per cent, the use of the diluent in these proportions will result in the co-polymer containing from about 15 to about 85 per cent of the diluent. Such proportion is usually sufficient to render the co-polymer quite soft and readily swelled by swelling solvents and, hence, easily separated from the insoluble non-swelling product.

The principle of the present invention may also be applied to the improved process for preparing the insoluble and non-swelling type of styrene co-polymer disclosed in the co-pending application of J. W. Zemba and G. H. Coleman, Serial No. 217,226, filed July 2, 1938, wherein the co-polymerization is carried out in the presence of an insoluble and non-swelling co-polymer "seed" in order to obtain an increased yield of the desired product.

The following examples illustrate several ways in which the principle of the invention has been applied, but are not to be construed as limiting the same.

EXAMPLE 1

The following table presents data illustrating the preparation of the insoluble and non-swelling type of styrene co-polymers in the presence of a number of inert diluents of the solvent type. In each case, a mixture of monomeric styrene and diallyl maleate, in the proportions indicated, was polymerized by heating at a temperature of about 80° C. for 7–14 days and in the presence of a diluent as indicated. The last column in the table gives the approximate amount of the insoluble, non-swelling type of co-polymer present in the entire polymerized mass, the remainder being of the glass-like, swelling type.

Table I

| Expt. No. | Diallyl maleate, per cent | Diluent | | Insoluble non-swelling co-polymer, per cent |
|---|---|---|---|---|
| | | Name | Per cent | |
| 1 | 9.0 | | | 75 |
| 2 | 6.5 | Cyclohexane | 26.5 | 90 |
| 3 | 8.0 | Benzene | 8.0 | 75 |
| 4 | 8.0 | Ethylene dichloride | 8.0 | 75 |
| 5 | 8.5 | Toluene | 8.5 | 75 |
| 6 | 8.5 | Petroleum oil (Finol) | 8.5 | 75 |
| 7 | 8.5 | Di-isobutylene | 8.5 | 75 |
| 8 | 8.5 | Iso-amyl chloride | 8.5 | 75 |
| 9 | 8.5 | Propylene dichloride | 8.5 | 75 |
| 10 | 6.5 | n-Butyl acetate | 26.5 | 90 |
| 11 | 8.0 | Methyl ethyl ketone | 8.0 | 90 |
| 12 | 8.5 | Sec.-butyl alcohol | 8.5 | 75 |

In each experiment, the small amount of glass-like, swelling co-polymer associated with the insoluble product was readily capable of being swelled to a thin gel or of forming viscous solutions in benzene and other aromatic hydrocarbon solvents, and, accordingly, the two types of product were easily separated by treating the mixed polymerizate with such solvents.

EXAMPLE 2

Mixtures of styrene and diallyl maleate were polymerized as in Example 1 in the presence of a number of diluents of the plasticizer type. In each case, the glass-like type of co-polymer present in the mixed polymerizate was readily capable of being separated from the insoluble non-swelling type of co-polymer by treatment with a swelling solvent. The following table lists the various diluents employed, as well as the approximate yield of non-swelling co-polymer obtained in each case:

Table II

| Expt. No. | Diallyl maleate, per cent | Diluent | | Insoluble non-swelling co-polymer, per cent |
|---|---|---|---|---|
| | | Name | Per cent | |
| 1 | 9.0 | | | 75 |
| 2 | 7.5 | Methyl abietate | 15.5 | 90 |
| 3 | 7.0 | Dibenzyl maleate | 8.0 | 75 |
| 4 | 8.5 | Butyl acetyl ricinoleate | 8.5 | 90 |
| 5 | 6.5 | 3-n-butoxy-diphenyl | 31.0 | 90 |
| 6 | 6.5 | Mixed amyl-diphenyl-oxides | 31.0 | 90 |
| 7 | 6.5 | B-chloro-B'-(2-chloro-4-tertiarybutylphenoxy)-diethyl ether | 31.0 | 90 |
| 8 | 6.5 | Ethyl o,p-toluene sulfonamide | 31.0 | 50 |
| 9 | 8.5 | Camphor | 8.5 | 100 |
| 10 | 7.5 | Dibenzyl succinate | 15.5 | 75 |
| 11 | 6.5 | Dicyclohexyl maleate | 31.0 | 100 |
| 12 | 5.0 | 1,2-di-(chlorophenyl)-ethane | 47.5 | 100 |
| 13 | 6.5 | Castor oil | 31.0 | 100 |
| 14 | 8.5 | Condensation product of formaldehyde and 2-hydroxy-5-tertiary-butyl-diphenyl | 8.5 | 100 |
| 15 | 6.5 | B-(4-tertiarybutylphenoxy)-ethyl cinnamate | 31.0 | 100 |

Similar results were obtained employing diallyl fumarate, ethylene dicinnamate, 2-chloroallyl crotonate, 2-chloroallyl furoate, and di-(2-chloroallyl) adipate as co-polymerizing agents.

EXAMPLE 3

A mixture of 100 parts of monomeric styrene, 30 parts of trimethallyl phosphate, 17.0 parts of 1,2-di-(chlorophenyl)-ethane, and 0.4 part of an insoluble and non-swelling co-polymer "seed" was polymerized by heating at a temperature of about 80° C. for 168 hours. The polymerized mixture was a solid mass containing approximately 65 per cent of the opaque, white, insoluble and non-swelling type of co-polymer, the remainder being of the transparent swellable type. The latter product was capable of being swelled to a thin gel in benzene, and, accordingly, was easily separated from the non-swelling co-polymer. The co-polymer "seed" employed was prepared by polymerizing at 80° C. a mixture of 25 parts of monomeric styrene, 2.5 parts of diallyl fumarate, and 5 parts of Florida tung oil.

In the following claims, the term chemically inert refers to any material which does not react with the monomeric styrene or the co-polymerizing agent, nor substantially retard or inhibit the formation of the insoluble non-swelling type of co-polymer, and which is capable of at least partially swelling styrene co-polymers of the type which is swelled by benzene and similar aromatic hydrocarbon solvents.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:

1. In a method of making a white, pulverulent, granular co-polymer of styrene, characterized by being substantially insoluble and non-swelling in benzene, in a form readily separable from the benzene swellable co-polymer normally formed simultaneously therewith; the step which comprises heating at a temperature below about 110° C. for a time sufficient to effect polymerization a mixture of styrene and a neutral unsaturated ester composed of a carboxylic acid containing less than 10 carbon atoms in the molecule esterified with an alcohol selected from the group consisting of allyl alcohol, 2-chloro-allyl alcohol, and 2-methyl allyl alcohol, said ester containing at least two olefinic linkages; said step being carried out in the presence of a diluent consisting of an organic compound which is liquid under polymerizing conditions and chemically inert to the styrene and the ester.

2. The process according to claim 1, wherein the neutral unsaturated ester is diallyl maleate.

3. The process according to claim 1, wherein the diluent is a hydrocarbon.

4. The process according to claim 1, wherein the diluent is a chlorinated hydrocarbon.

5. The process according to claim 1, wherein the diluent is an ester.

6. In a method for making a white, pulverulent, granular co-polymer of styrene, characterized by being substantially insoluble and non-swelling in benzene, in a form readily separable from the benzene swellable co-polymer normally formed simultaneously therewith; the step which comprises heating at a temperature below about 110° C. for a time sufficient to effect polymerization, a mixture of styrene and a neutral unsaturated ester composed of a carboxylic acid containing less than 10 carbon atoms in the molecule esterified with an alcohol selected from the group consisting of allyl alcohol, 2-chloro allyl alcohol, and 2-methyl allyl alcohol, said ester containing at least two olefinic linkages; said step being carried out in the presence of a diluent consisting of an organic compound which is liquid at the polymerization temperature and chemically inert to the styrene and the ester and also in the presence of a small proportion of a white, pulverulent, granular co-polymer of styrene substantially insoluble and non-swelling in benzene.

7. In a method of making a white, pulverulent, granular co-polymer of styrene characterized by being substantially insoluble and non-swelling in benzene in a form readily separable from the benzene swellable co-polymer normally formed simultaneously therewith; the step which comprises heating at a temperature below about 110° C. for a time sufficient to effect polymerization a mixture of styrene and a neutral unsaturated ester composed of a carboxylic acid containing less than 10 carbon atoms in the molecule esterified with an alcohol selected from the group consisting of allyl alcohol, 2-chloro allyl alcohol, and 2-methyl allyl alcohol; said ester containing at least two olefinic linkages; said step being carried out in the presence of a diluent consisting of an organic compound which is liquid under polymerizing conditions and chemically inert to the styrene and the said ester, and thereafter separating the non-swelling co-polymer from the benzene swellable co-polymer by treating the mixed polymerizate with a swelling solvent.

EDGAR C. BRITTON.
GERALD H. COLEMAN.
JOHN W. ZEMBA.